US009720175B2

(12) United States Patent
Sasaki et al.

(10) Patent No.: US 9,720,175 B2
(45) Date of Patent: Aug. 1, 2017

(54) FUSION SPLICING APPARATUS AND FUSION SPLICING METHOD

(71) Applicant: FUJIKURA LTD., Koto-ku, Tokyo (JP)

(72) Inventors: Katsumi Sasaki, Sakura (JP);
Kunihiko Terada, Sakura (JP);
Noriyuki Kawanishi, Sakura (JP);
Kouichi Yokota, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 373 days.

(21) Appl. No.: 13/944,011

(22) Filed: Jul. 17, 2013

(65) Prior Publication Data

US 2013/0298610 A1    Nov. 14, 2013

Related U.S. Application Data

(63) Continuation of application No. PCT/JP2011/051200, filed on Jan. 24, 2011.

(51) Int. Cl.
*G02B 6/255*    (2006.01)

(52) U.S. Cl.
CPC ......... *G02B 6/2555* (2013.01); *G02B 6/2553* (2013.01)

(58) Field of Classification Search
CPC .................................................... G02B 6/2555
See application file for complete search history.

(56) References Cited

U.S. PATENT DOCUMENTS

| 4,474,469 | A  |   | 10/1984 | Abe |
|---|---|---|---|---|
| 5,149,350 | A  | * | 9/1992  | Itoh ...................... G02B 6/2551 |
|           |    |   |         | 156/502 |
| 5,611,015 | A  | * | 3/1997  | Tokumaru ............ G01M 11/088 |
|           |    |   |         | 385/98 |
| 6,034,718 | A  | * | 3/2000  | Hattori ................... G01M 11/37 |
|           |    |   |         | 348/125 |
| 6,287,020 | B1 | * | 9/2001  | Osaka .................... G01M 11/37 |
|           |    |   |         | 356/73.1 |

(Continued)

FOREIGN PATENT DOCUMENTS

| CN | 1214455 A | 4/1999 |
| DE | 202007009481 U1 | 10/2007 |

(Continued)

OTHER PUBLICATIONS

European Search Report in European Application No. 11856993.8 mailed Jun. 26, 2014.

(Continued)

*Primary Examiner* — Cynthia Szewczyk
(74) *Attorney, Agent, or Firm* — Sughrue Mion, PLLC

(57) ABSTRACT

A fusion splicing apparatus fusion-splices end faces 1a and 3a of a pair of optical fibers 1 and 3 to each other. The apparatus includes a mirror shaft 21 provided with a mirror 23 that is arranged between the end faces 1a and 3a of the pair of optical fibers 1 and 3 that are faced toward and spaced away from each other and is movable between a first position to reflect an image of the end face 1a and a second position to reflect an image of the end face 3a, a first camera 25 that takes the image of the end face 1a reflected in the first position, and a second camera 27 that takes the image of the end face 3a reflected in the second position.

7 Claims, 9 Drawing Sheets

(56) References Cited

U.S. PATENT DOCUMENTS

| | | | |
|---|---|---|---|
| 7,061,522 B1* | 6/2006 | Kojima | G01M 11/37 348/47 |
| 2002/0094188 A1* | 7/2002 | Kojima | G01B 11/272 385/147 |
| 2004/0047572 A1* | 3/2004 | Hattori | G02B 6/2551 385/96 |
| 2005/0254754 A1* | 11/2005 | Huang | G02B 6/2555 385/52 |

FOREIGN PATENT DOCUMENTS

| | | |
|---|---|---|
| EP | 0091738 A2 | 10/1983 |
| JP | 01-147506 A | 6/1989 |
| JP | 08-114720 A | 5/1996 |
| JP | 2000-028845 A | 1/2000 |
| JP | 2004-053625 A | 2/2004 |
| JP | 2007-279291 A | 10/2007 |

OTHER PUBLICATIONS

Office Action issued by Japanese Patent Office in Japanese Application No. 2012-554515 dated Oct. 29, 2013.

Communication dated Feb. 28, 2015, issued by the State Intellectual Property Office of the People's Republic of China in counterpart Application No. 201180065396.2.

Communication dated Sep. 23, 2015 from the State Intellectual Property Office of the P.R.C. in counterpart application No. 201180065396.2.

* cited by examiner

FUSION SPLICING APPARATUS AND FUSION SPLICING METHOD

CROSS REFERENCE TO RELATED APPLICATION

This application is a Continuation of PCT Application No. PCT/JP2011/051200, filed on Jan. 24, 2011.

TECHNICAL FIELD

The present invention relates to a fusion splicing apparatus and fusion splicing method to fusion-splice end faces of a pair of optical fibers to each other.

BACKGROUND ART

An optical fiber, for example, a polarization-maintaining optical fiber generally has a core and stress applying member within cladding. Known aligning methods used when fusion-splicing a pair of such optical fibers to each other are described in below-mentioned Patent Literatures 1 and 2.

The aligning methods described in these publications arrange end faces of a pair of optical fibers so that they are faced toward and spaced away from each other, take images of the vicinities of the end faces from a side thereof with a camera, process the taken images, display the processed images, and conduct the alignment according to the displayed images.

CITATION LIST

Patent Literature

Patent Literature 1: Japanese Unexamined Patent Application Publication No. H01-147506
Patent Literature 2: Japanese Unexamined Patent Application Publication No. H08-114720

SUMMARY OF INVENTION

Problems to be Solved by Invention

The aligning methods of the above-mentioned related arts take the images from a side of optical fibers instead of observing them from a direction facing end faces thereof. Accordingly, the related arts must conduct complicated image processing, hardly provide precision images, and involve a risk of hindering the aligning work.

To deal with the problems, a mirror is arranged for each of the end faces of the pair of optical fibers that are faced toward and spaced away from each other, the mirrors being positioned between the end faces and inclined by 45 degrees with respect to the end faces. Images reflected by the mirrors are simultaneously taken with one camera, to realize an observation from the direction facing the end faces of the optical fibers.

This technique, however, causes a problem that, when simultaneously photographing the end faces of the pair of optical fibers with one camera, in particular, when a fiber diameter is large, the fiber diameter exceeds an imaging range of the camera, to provide an incomplete image. Even if the fiber diameter is within the imaging range of the camera, the images of the end faces may deviate from the center of the camera, to hardly provide precision images.

An object of the present invention is to correctly take images of end faces of a pair of optical fibers that are fusion-spliced to each other.

Means to Solve Problems

An aspect of the present invention provides a fusion splicing apparatus for fusion-splicing end faces of a pair of optical fibers to each other. The apparatus is characterized in that it includes a reflector that is arranged between the end faces of the pair of optical fibers that are faced toward and spaced away from each other and is movable between a first position to reflect an image of a first one of the end faces and a second position to reflect an image of a second one of the end faces and an imaging part that individually takes the image of the first end face reflected by the reflector in the first position and the image of the second end face reflected by the reflector in the second position.

The reflector may have one reflection face that is turnable by 180 degrees between the first position and the second position around a rotation axis orthogonal to axes of the optical fibers. The imaging part may have a first imager that takes the image of the first end face reflected in the first position and a second imager that takes the image of the second end face reflected in the second position.

The apparatus may have a cam face that is arranged on the reflector, is faced toward an axial direction of the rotation axis, and is spiraled around the rotation axis and a guided part that is guided along and moved relative to the cam face, to move the reflector in the axial direction of the rotation axis, and at the same time, turn the reflector around the rotation axis, the cam face including at least a pair of cam faces that are formed adjacent to each other in the turn direction, are inclined in different directions, and are faced toward each other, adjacent parts of the pair of cam faces overlapping each other in a circumferential direction.

The reflector may be configured so that, when moved to a first side in the axial direction of the rotation axis, a first one of the pair of cam faces moves in contact with the guided part and turns by 90 degrees, and when moved to a second side in the axial direction of the rotation axis, a second one of the pair of cam faces moves in contact with the guided part and turns by 90 degrees.

The apparatus may have a resilient unit that moves the reflector to the first side in the axial direction of the rotation axis and a drive unit that moves the reflector against the resilient unit to the second side in the axial direction of the rotation axis.

The reflector may have two reflection faces, the two reflection faces being arranged at positions that are spaced from each other in a direction orthogonal to the axes of the optical fibers and are separated from each other by 180 degrees around the rotation axis and being movable in the direction orthogonal to the axes of the optical fibers between the first position and the second position.

The apparatus may have a display unit that displays the images taken by the first and second imagers, the display unit individually displaying the images.

Another aspect of the present invention provides a fusion splicing method of fusion-splicing end faces of a pair of optical fibers to each other. The method is characterized in that it includes setting the pair of optical fibers so that the end faces are faced toward and spaced away from each other, reflecting, between the end faces, an image of a first one of the end faces of the pair of optical fibers with a reflector, taking the reflected image with an imaging part, reflecting, between the end faces, an image of a second one of the end faces of the pair of optical fibers with the reflector, taking the reflected image with the imaging part, and individually observing the images taken with the imaging part.

MODE OF IMPLEMENTING INVENTION

Modes of implementing the present invention will be explained in detail with reference to the drawings.

Figure 1:
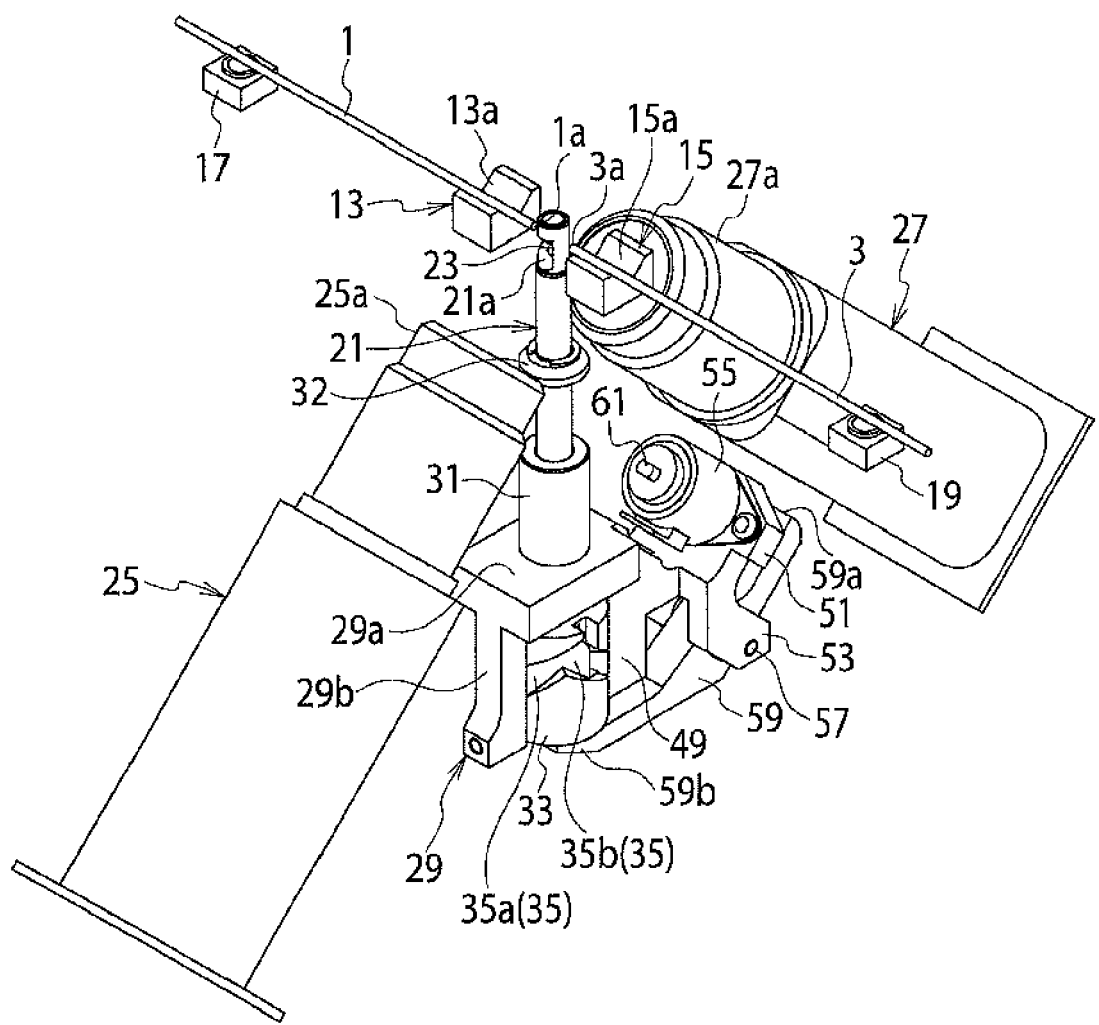
FIG. 1 is a perspective view illustrating a fusion splicing apparatus according to an embodiment of the present invention
Figure 2:
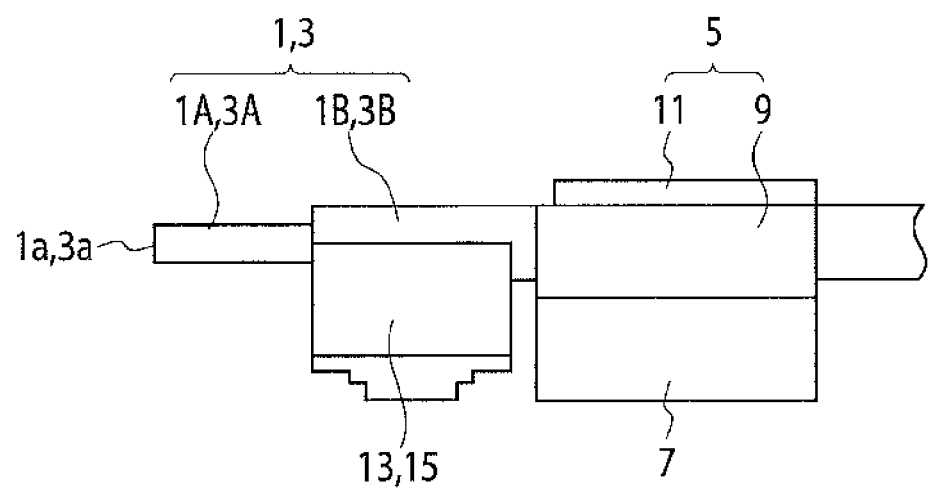
FIG. 2 is a side view illustrating an optical fiber supporting part of the fusion splicing apparatus of FIG. 1

As illustrated in FIG. 1, a pair of optical fibers 1 and 3 are set so that they face each other in an axial direction and their end faces 1a and 3a are spaced away from each other. Fiber holders 5 illustrated in FIG. 2 are provided for the optical fibers 1 and 3, respectively, to hold them. The fiber holder 5 has a holder body 9 that is detachably attached to a holder base 7. The holder body 9 has a recess to receive the optical fiber 1 (3) and a presser plate 11 is opened/closed from above, to fix the optical fiber 1 (3).

The optical fiber 1 (3) has, as illustrated in FIG. 2, a quartz glass fiber 1A (3A) and a resin coat 1B (3B) that covers the periphery of the quartz glass fiber 1A (3A). The fiber holder 5 holds a part of the optical fiber where the resin coat 1B (3B) is present. The optical fibers 1 and 3 may be or may not be polarization maintaining optical fibers.

On the end face 1a (3a) side of the fiber holder 5, the optical fiber 1 (3) is positioned and held by a V-groove block 13 (15). Like the fiber holder 5, the V-groove block 13 (15) positions and fixes the part of the optical fiber where the resin coat 1B (3B) is present. The V-groove block 13 (15) may position and fix a part of the optical fiber where the glass fiber 1A (3A) is present.

The V-groove block 13 (15) is provided with a clamp (not illustrated) that partly enters into a V-groove 13a (15a) and clamps the optical fiber 1 (3) with respect to the V-groove block 13 (15).

After the end faces 1a and 3a of the pair of optical fibers 1 and 3 are photographed and observed according to a method to be explained later, the fiber holder 5 as a whole is turned around an axis of the optical fiber 1 (3) to allow the optical fibers 1 and 3 to be aligned or centered with respect to each other.

As illustrated in FIG. 1, LED lamps 17 and 19 are arranged at proper positions along the pair of optical fibers 1 and 3, to project light into the optical fibers 1 and 3 from a side thereof. The light projected from the LED lamps 17 and 19 into the optical fibers 1 and 3 exits from the end faces 1a and 3a of the optical fibers 1 and 3.

The part of the optical fiber 1 (3) into which the light from the LED lamp 17 (19) is projected may be a part of the glass fiber 1A (3A) or a part of the resin coat 1B (3B). If the part is on the resin coat 1B (3B), the resin coat 1B (3B) must be transparent. The part of the optical fiber 1 (3) irradiated with the light from the LED lamp 17 (19) must circumferentially be covered so that the projected light will not leak outside.

In FIG. 1, the LED lamps 17 and 19 are arranged on a side of the optical fibers 1 and 3. If the optical fibers 1 and 3 are short, the LED lamps may be arranged to project light into end faces of the optical fibers opposite to the end faces 1a and 3a.

Between the end faces 1a and 3a of the pair of optical fibers 1 and 3, a mirror shaft 21 is arranged as a reflector extending in a vertical direction orthogonal to the axes of the optical fibers 1 and 3. The mirror shaft 21 is vertically movable and is turnable. A side part at a front end (upper end) of the mirror shaft 21 has a recess 21a to which a mirror 23 having a reflection face is attached.

When the mirror shaft 21 is at an ascended position as illustrated in FIG. 1, the mirror 23 reflects an image of one of the end faces 1a and 3a of the optical fibers 1 and 3. Reflected light from the mirror 23 is oriented toward one of a first camera 25 serving as a first imaging part and a second camera 27 serving as a second imaging part, the cameras 25 and 27 being arranged on each side of the mirror shaft 21. Optical axes of optical systems of the first and second cameras 25 and 27 are inclined with respect to a horizontal plane and front ends thereof are provided with first and second lenses 25a and 27a, respectively.

Figure 3:
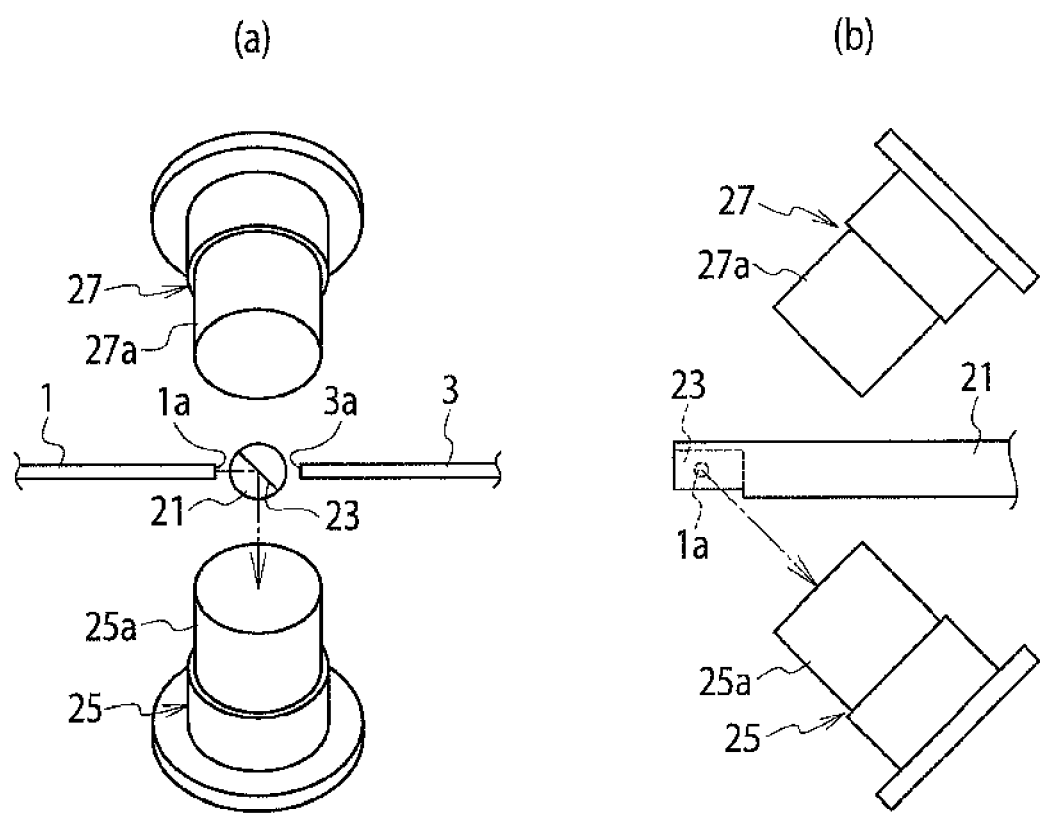
FIG. 3 is a plan view (a) and a right side view (b) of the view (a), illustrating the fusion splicing apparatus of FIG. 1 photographing an end face of a first one of optical fibers
Figure 4:
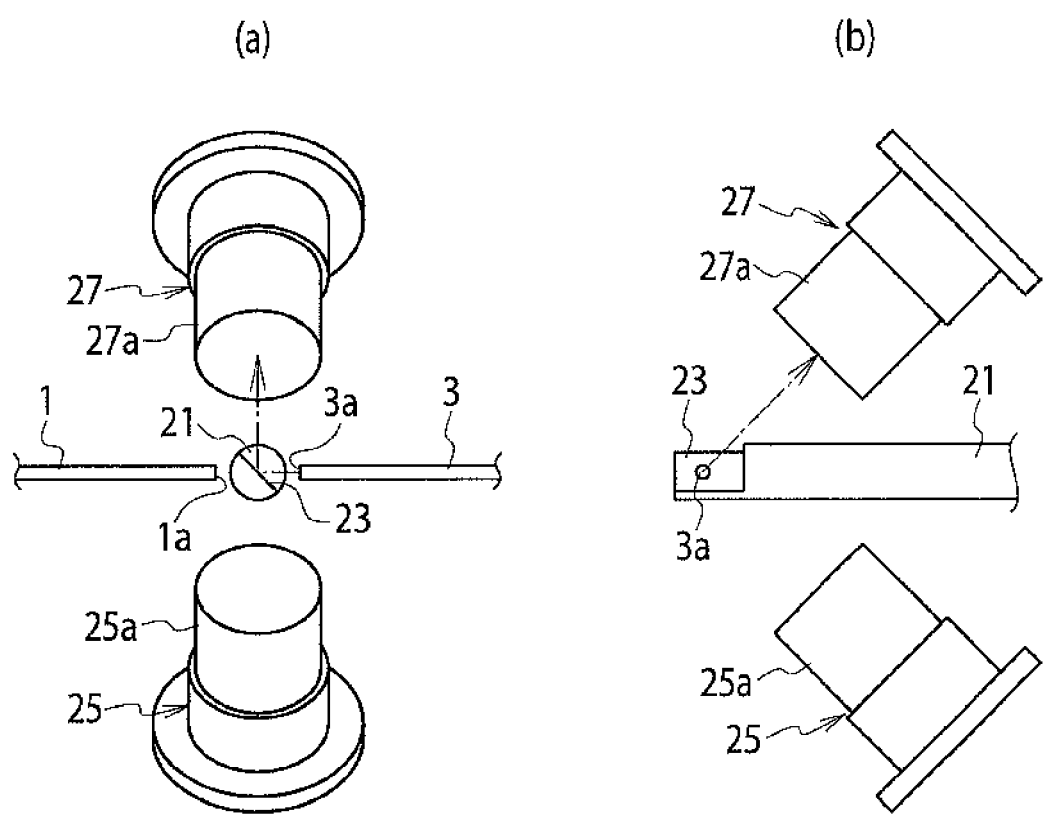
FIG. 4 is a plan view (a) and a right side view (b) of the view (a), illustrating the fusion splicing apparatus of FIG. 1 photographing an end face of a second one of the optical fibers

In a first position illustrated in FIG. 3 corresponding to the state of FIG. 1, an image of the end face 1a of the optical fiber 1 is reflected by the mirror 23 and is made incident to the first lens 25a. In a second position illustrated in FIG. 4 that is established by turning the mirror shaft 21 by 180 degrees from the state of FIGS. 1 and 3, an image of the end face 3a of the other optical fiber 3 is reflected by the mirror 23 and is made incident to the second lens 27a. The reflection face of the mirror 23 is positioned to contain a rotation axis of the mirror shaft 21, and therefore, the reflection face is positionally unchanged when the mirror shaft 21 is turned by 180 degrees.

Figure 5:
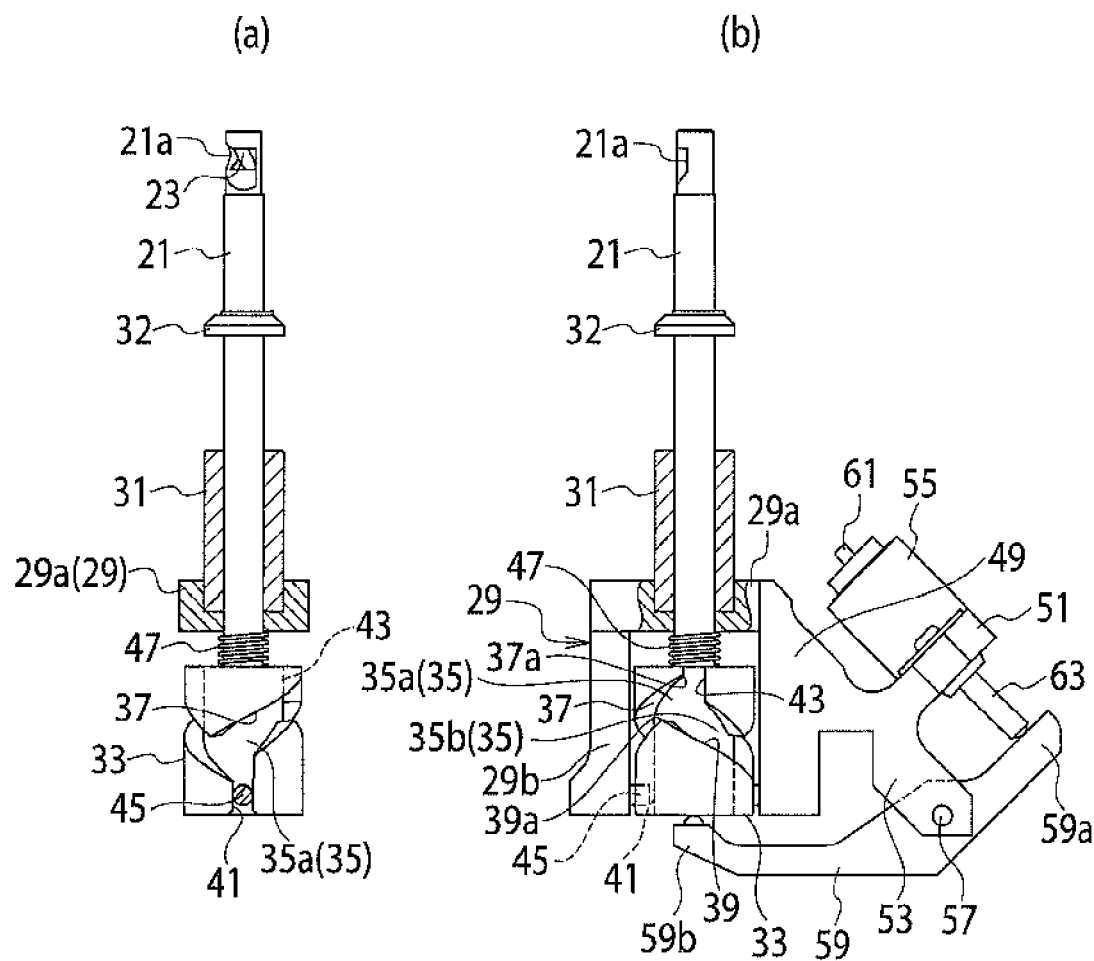
FIG. 5 is a side view (a) seen from a side orthogonal to the optical fibers of FIG. 1 and a front view (b) seen from a longitudinal direction of the optical fibers, illustrating the fusion splicing apparatus of FIG. 1 with a mirror shaft thereof being at an ascended position
Figure 6:
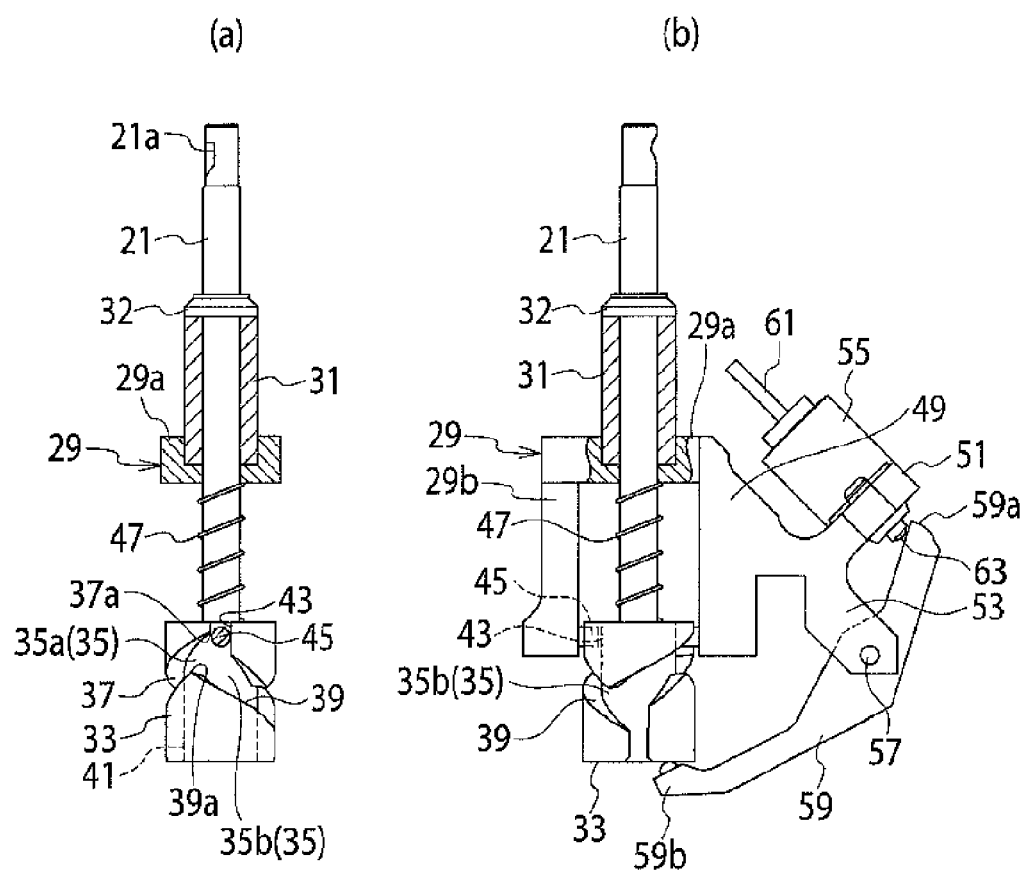
FIG. 6 is a side view (a) seen from a side orthogonal to the optical fibers of FIG. 1 and a front view (b) seen from a longitudinal direction of the optical fibers, illustrating the fusion splicing apparatus of FIG. 1 with the mirror shaft being at a descended position
Figure 7:
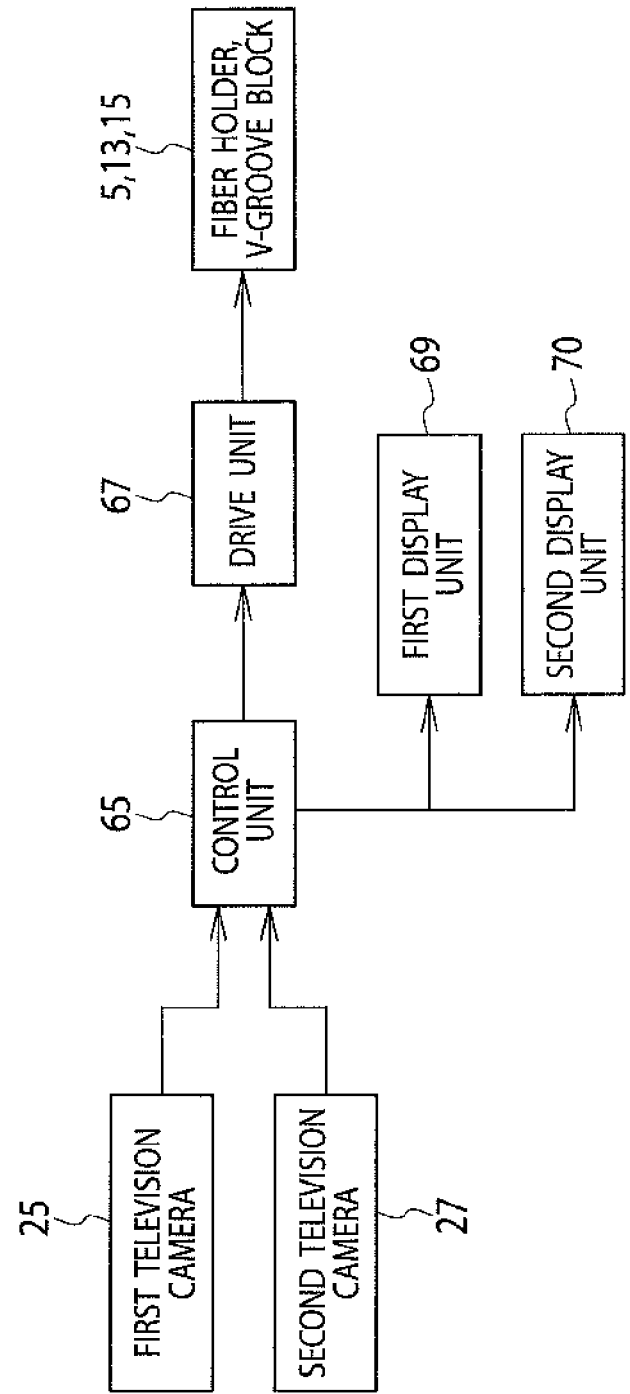
FIG. 7 is a control block diagram of the fusion splicing apparatus of FIG. 1

A turning mechanism for turning the mirror shaft 21 around the rotation axis of the mirror shaft 21 orthogonal to the axes of the optical fibers 1 and 3 will be explained. FIG. 5 illustrates a state in which the mirror shaft 21 is at the ascended position like FIG. 1. FIG. 6 illustrates a state in which the mirror shaft 21 is at a descended position. Compared with the state of FIG. 5, the state of FIG. 6 turns the mirror shaft 21 by 90 degrees around the rotation axis thereof in a clockwise direction in a top view of FIG. 5.

The mirror shaft 21 is vertically movable relative to a fixed bracket 29. The bracket 29 has an upper plate 29a and a guide cylinder 31 which upwardly protrudes from the upper plate 29a and whose lower part is attached to the upper plate 29a. The mirror shaft 21 is inserted into the guide cylinder 31 and is vertically moved. A stopper flange 32 is attached to the mirror shaft 21 on the mirror 23 side of the guide cylinder 31. When the mirror shaft 21 descends as illustrated in FIG. 6, an upper end of the guide cylinder 31 comes in contact with the stopper flange 31, to restrict the mirror shaft 21 from farther descending.

A lower end of the mirror shaft 21 is integral with a cylindrical member 33. One of semicircular parts on the periphery of the cylindrical member 33 is provided with a groove 35 whose front view is illustrated in FIG. 6(a). The groove 35 includes a first inclined groove 35a that spirals from the vicinity of an end of the mirror shaft 21 axially opposite to the mirror 23 toward the mirror 23 and a second inclined groove 35b that spirals from an upper end of the first inclined groove 35a in a downward direction opposite to the mirror 23.

A face of the first inclined groove 35a on the mirror 23 side is a guide slope 37. A face of the second inclined groove 35b opposite to the mirror 23 is a guide slope 39. The guide slopes 37 and 39 form at least one pair of cam faces that have different inclination directions and are faced toward each other.

As illustrated in FIG. 5(b), the guide slopes 37 and 39 are formed adjacent to each other in a turn direction and adjacent parts of the pair of guide slopes 37 and 39 overlap each other in a circumferential direction. Namely, as illustrated in FIG. 5(b), an upper end 37a of the guide slope 37 and an upper end 39a of the guide slope 39 overlap each other in a manner of the turn direction.

As illustrated in FIG. 5(a), an axial lower part of the cylindrical member 33 that faces the guide slope 37 is provided with a lower axial groove 41 extending in a vertical direction. As illustrated in FIG. 5(b), an axial upper part of the cylindrical member 33 that faces the guide slope 39 is provided with an upper axial groove 43 extending in a vertical direction. The axial grooves 41 and 43 are formed at positions spaced apart from each other by 90 degrees in a circumferential direction.

A projection 45 as a guided part is formed on the fixed bracket 29 and moves along the spiral groove 35 and axial grooves 41 and 43. The projection 45 inwardly projects at a front end of an arm 29b that downwardly extends from one side of the upper plate 29a of the fixed bracket 29. The projection 45 is formed to enter the groove 35 and axial grooves 41 and 43. The projection 45 is positioned in the lower axial groove 41 in FIG. 5 and in the upper axial groove 43 in FIG. 6. Positioned in the axial grooves 41 and 43, the projection 45 restricts the turn of the mirror shaft 23.

The spiral groove 35 and axial grooves 41 and 43 are similarly formed on the other semicircular part of the cylindrical member 33, i.e., on the back side of FIG. 5(b).

Between an upper end face of the cylindrical member 33, that is provided with the groove 35 and axial grooves 41 and 43, and the upper plate 29a of the fixed bracket 29, a spring 47 as a resilient unit is provided to always downwardly push the mirror shaft 21.

As illustrated in FIGS. 5(b) and 6(b), the fixed bracket 29 has a mirror shaft drive mechanism fitting unit on the opposite side of the arm 29b with the mirror shaft 21 interposed between them. The mirror shaft drive mechanism fitting unit 49 has a motor fitting arm 51 that is upwardly bent outside the mirror shaft 21 and a turn link fitting arm 53 that is downwardly bent outside the mirror shaft 21.

A motor 55 serving as a drive unit is attached to an upper part of the motor fitting arm 51. A turn link 59 is pivotally attached through a turn support pin 57 to a front end of the turn link fitting arm 53. A rotary drive shaft 61 of the motor 55 is connected to a threaded shaft 63 of a ball screw. When the rotary drive shaft 61 rotates, the threaded shaft 63 rotates relative to a nut (not illustrated) and axially moves.

A front end of the threaded shaft 63 is in contact with a first end 59a of the turn link 59. A second end 59b of the turn link 59 is in contact with a lower end face of the cylindrical member 33.

When the mirror shaft 21 is at the ascended position as illustrated in FIGS. 1 and 5, the threaded shaft 63 is advanced. At this time, the second end 59b of the turn link 59 upwardly pushes the lower end face of the cylindrical member 33, thereby compressing the spring 47. When, from this state, the motor 55 is driven to retract the threaded shaft 63, the turn link 59 counterclockwise turns in FIG. 5(b), to expand the spring 47. The resilient force of the spring 47 downwardly moves the cylindrical member 33 and mirror shaft 21 as illustrated in FIG. 6.

When the cylindrical member 33 descends from the state of FIG. 5, the projection 45 relatively ascends from the lower axial groove 41 and comes in contact with the just-above guide slope 37. The projection 45 is pressed to the guide slope 37 and is relatively moved. Since the projection 45 is fixed to the fixed bracket 29, the above-mentioned relative movement clockwise moves the cylindrical member 33 by 90 degrees in a top view of FIG. 5(a), thereby establishing the state of FIG. 6(a). At this time, the mirror shaft 21 is at the descended position with the projection 45 entered in the upper axial groove 43 and the spring 47 expanded.

Thereafter, the motor 55 is driven in a reverse direction of the above-mentioned direction, to advance the threaded shaft 63 from the state of FIG. 6. Then, the turn link 59 clockwise turns in FIG. 6(b), to upwardly move the cylindrical member 33 against the spring 47. When the cylindrical member 33 ascends, the projection 45 positioned in the upper axial groove 43 as illustrated in FIG. 6(a) comes in contact with the just-below guide slope 39 and pushes the same. As a result, the cylindrical member 33 further turns by 90 degrees in the direction mentioned above.

In this way, the mirror shaft 21 turns by 90 degrees and descends from the ascended position illustrated in FIGS. 1 and 5 when the motor 55 is driven to retract the threaded shaft 63. When the threaded shaft 63 is advanced, the mirror shaft 21 turns by 90 degrees and ascends. Namely, repeating once the advancement and retraction of the threaded shaft 63 results in turning the orientation of the mirror 23 by 180 degrees with the mirror shaft 21 returned to the ascended position.

Namely, in the state of FIGS. 1 and 5, an image of the end face 1a of the optical fiber 1 is reflected by the mirror 23, is made incident to the first lens 25a, and is photographed with the first camera 25. From this state, the motor 55 is driven to turn the mirror shaft 21 by 180 degrees so that an image of the end face 3a of the other optical fiber 3 is reflected by the mirror 23, is made incident to the second lens 27a, and is photographed with the second camera 27.

After the mirror shaft 21 is turned by 180 degrees, the motor 55 is further driven to once repeat the retraction and advancement of the threaded shaft 63, to bring the orientation of the mirror 23 to the original state to reflect the image of the end face 1a of the optical fiber 1 as illustrated in FIG. 1.

The images photographed with the first and second cameras 25 and 27 are individually processed with an image processing circuit of a control unit 65, to provide individual data. According to the data, the whole of each fiber holder 5 illustrated in FIG. 2 is turned around the axes of the optical fibers 1 and 3, thereby carrying out aligning work. Alternatively, only the V-groove blocks 13 and 15 are moved in a radial direction, to align the axes of the optical fibers 1 and 3. The individual image data of the optical fibers 1 and 3 are individually displayed on first and second display units 69 and 70.

After the aligning work or the axes alignment, the end faces 1a and 3a of the optical fibers 1 and 3 are brought in contact with each other and are fusion-spliced with the use of discharge electrodes (not illustrated). To achieve the fusion splicing, the mirror shaft 21 is moved to the descended position as illustrated in FIG. 6 in order not to interfere with the mirror shaft 21. To bring the end faces 1a and 3a in contact with each other, the fiber holders 5 are axially moved.

In this way, the embodiment individually takes images of the end faces 1a and 3a of the pair of optical fibers 1 and 3 to be fusion-spliced with the use of the single mirror 23 arranged on the mirror shaft 21 that is turnable by 180 degrees. Compared with laterally photographing the optical fibers, photographing the end faces 1a and 3a provides more precise images. In addition, individually photographing the end faces 1a and 3a of the optical fibers 1 and 3 with the first and second cameras 25 and 27 assigned to the end faces 1a and 3a provides high-precision images.

At this time, the first camera 25 takes the image of the end face 1a of the optical fiber 1 so that the image is received at the center of the first lens 25a and the second camera 27 takes the image of the end face 3a of the other optical fiber 3 so that the image is received at the center of the second lens 27a. Due to this, even a large fiber diameter can easily be contained within the photographing range of each camera. This avoids incomplete images that may be obtained when a single camera is used to simultaneously photograph the pair of optical fibers. Consequently, the embodiment provides high-precision images.

Photographing and observing the end faces 1a and 3a of the optical fibers 1 and 3 result in finding damaged parts such as cuts on the end faces 1a and 3a and allowing detection of defective products before conducting the fusion splicing.

According to the embodiment, the mirror shaft 21 has one mirror 23 and is turnable by 180 degrees between the first and second positions around the rotation axis thereof orthogonal to the axes of the optical fibers 1 and 3. There are the first camera 25 to take an image of the end face 1a reflected in the first position and the second camera 27 to take an image of the other end face 3a reflected in the second position.

The images of the end faces 1a and 3a are individually reflected by the single mirror 23 toward the first and second cameras 25 and 27, and therefore, the images taken with these cameras 25 and 27 are easily identifiable which image is of which optical fiber.

The embodiment employs the guide slopes 37 and 39 that are formed on the mirror shaft 21, are faced toward the axial direction of the rotation axis, and are spiraled around the rotation axis. Also employed is the projection 45 that is guided along the guide slopes 37 and 39, to move the mirror shaft 21 in the axial direction of the rotation axis and turn the same around the rotation axis. The guide slopes 37 and 39 are formed in the rotation direction such that they incline in different directions, face each other, and are adjacent to each other. Adjacent parts of the guide slopes 37 and 39 overlap each other in a circumferential direction.

When the mirror shaft 21 is vertically reciprocated, the projection 45 is successively guided along the guide slopes 37 and 39, to turn the mirror 21 in the same direction by 90 degrees each time, 180 degrees in total.

The embodiment moves the mirror shaft 21 to a first side of the rotation axis so that one of the guide slopes 37 and 39 is moved in contact with the projection 45 and is turned by 90 degrees and to a second side of the rotation axis that is opposite to the first side so that the other of the guide slopes 37 and 39 is moved in contact with the projection 45 and is turned by 90 degrees.

Namely, only by vertically moving the mirror shaft 21, the embodiment can turn the same by 90 degrees each time, 180 degrees in total.

The embodiment employs the spring 47 that biases and moves the mirror shaft 21 to the axial first side of the rotation axis and the motor 55 that moves the mirror shaft 21 against the spring 47 to the axial second side of the rotation axis. The mirror shaft 21 is moved to the second side by driving the motor 55 against the spring 47 and is easily moved to the first side by releasing the spring 47 compressed by the motor 55. At this time, only one motor 55 is sufficient, thereby reducing the number of parts and simplifying the structure.

The embodiment employs the first display unit 69 and second display unit 70 to display the images photographed with the first camera 25 and second camera 27, respectively. The display units 69 and 70 individually display the images. With this, the end faces 1a and 3a of the pair of optical fibers 1 and 3 are easily observed.

Although the embodiment employs the first and second cameras 25 and 27 serving as the imagers, one camera will be sufficient if the mirror shaft 23 is counterclockwise turned by 90 degrees from the state of FIG. 3(a) so that the reflected image of each of the end faces 1a and 3a is oriented in the same direction (downward direction in FIG. 3(a)). In this case, the mirror shaft 23 must be turned without vertically moving, and therefore, there are needed a drive mechanism for conducting only the turning motion and a drive mechanism for conducting only a vertical movement so that the mirror shaft 23 is downwardly retracted at the time of fusion splicing.

The embodiment arranges only one projection 45 at a lower end of the arm 29b. A projection like the projection 45 may be formed in FIG. 5(b) at a lower end of the mirror shaft drive mechanism fitting unit 49 facing the projection 45 in left-right symmetry with respect to the projection 45. Like the projection 45, the additional projection relatively moves in the groove 35 to function like the projection 45.

The additional projection may be arranged at an axially different position with respect to the projection and a groove like the groove 35 may be formed at an axially different position.

Figure 8:
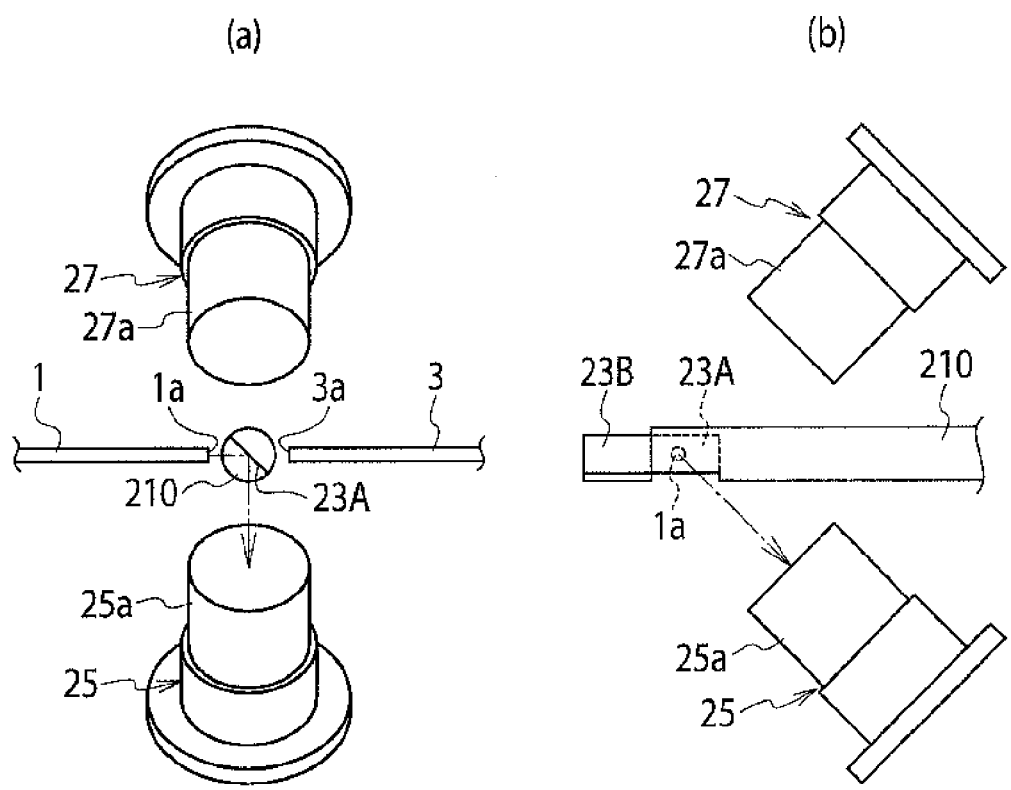
FIG. 8 is a plan view (a) and a right side view (b) of the view (a) corresponding to FIG. 3, illustrating a fusion splicing apparatus according to another embodiment of the present invention
Figure 9:
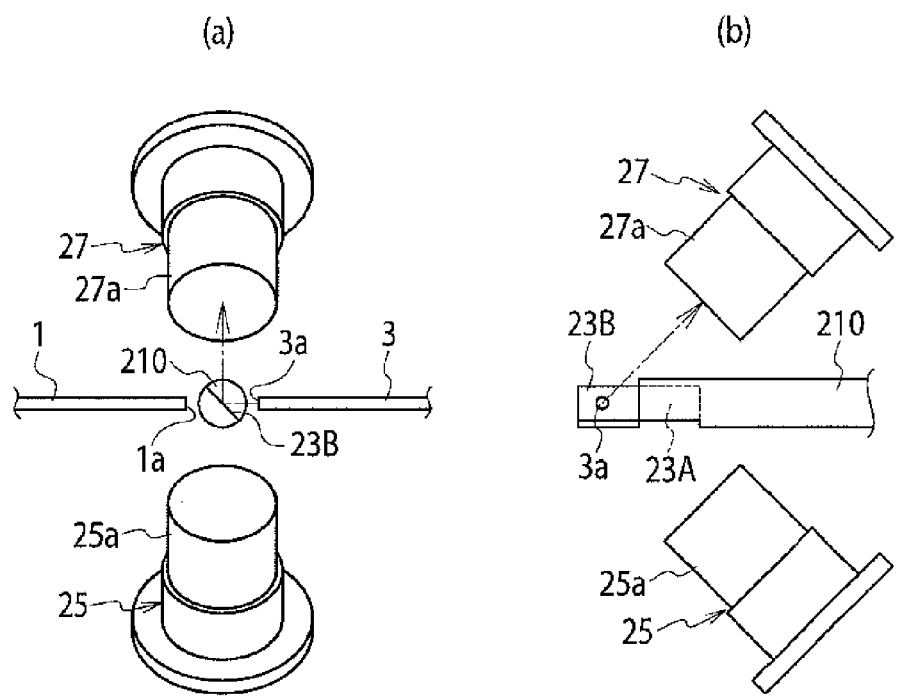
FIG. 9 is a plan view (a) and a right side view (b) of the view (a) corresponding to FIG. 4, illustrating the fusion splicing apparatus according to the embodiment of FIG. 8

Another embodiment illustrated in FIGS. 8 and 9 arranges two mirrors 23A and 23B on a mirror shaft 210 at positions spaced apart from each other. The mirror shaft 210 is movable in an axial direction orthogonal to the plane of FIGS. 8(a) and 9(a). The two mirrors 23A and 23B positionally differ from each other by 180 degrees around an axis of the mirror shaft 210. When the mirror shaft 210 is axially moved, one of the two mirrors 23A and 23B is positioned on the axes of the optical fibers 1 and 3.

FIG. 8 illustrates the mirror shaft 210 in an ascended state. In this state, the mirror 23A on a base side is on the axes of the optical fibers 1 and 3. At this time, the mirror 23A is in a first position to reflect an image of the end face 1a of the optical fiber 1 and make the image incident to the first lens 25a of the first camera 25.

On the other hand, FIG. 9 illustrates the mirror shaft 210 in a descended state. In this state, the mirror 23B on a front end side is on the axes of the optical fibers 1 and 3. At this time, the mirror 23B is in a second position to reflect an image of the end face 3a of the other optical fiber 3 and make the image incident to the second lens 27a of the second camera 27.

In this way, this embodiment also individually photographs and observes the end faces 1a and 3a of the pair of optical fibers 1 and 3. Compared with laterally photographing the optical fibers, the embodiment provides highly precise images. The first and second cameras 25 and assigned to the end faces 1a and 3a of the pair of optical fibers 1 and 3 take highly precise images.

Although needing the two mirrors 23A and 23B, the embodiment is capable of photographing each of the end faces 1a and 3a of the pair of optical fibers 1 and 3 only by axially moving the mirror shaft 210 to which the mirrors 23A and 23B are attached. Accordingly, this embodiment can simplify the structure as a whole compared with the preceding embodiment that employs the mechanism for turning the mirror shaft.

The embodiment may have a mechanism for turning the mirror shaft 210, to descend the mirror shaft 210 from the state of FIG. 8 and turn the same by 90 degrees in FIG. 8(a). This may reduce the cameras to only the lower camera 25 in FIGS. 8 and 9.

INDUSTRIAL APPLICABILITY

The present invention is applicable to fusion splicing apparatuses that fusion-splice end faces of a pair of optical fibers to each other.

EFFECTS OF INVENTION

The present invention individually photographs end faces of a pair of optical fibers with the imaging part by moving the reflector and provides high precision images.

The invention claimed is:

1. A fusion splicing apparatus for fusion-splicing end faces of a pair of optical fibers to each other, comprising:
    a reflector that is configured to be arranged between the end faces of the pair of optical fibers that are faced toward and spaced away from each other and is movable among a first position to reflect an image of only a first one of the end faces, a second position to reflect an image of only a second one of the end faces, and a third position to retract the reflector from the first and second end faces;
    a first imager that takes the image of the first end face reflected by the reflector in the first position; and
    a second imager that takes the image of the second end face reflected by the reflector in the second position, wherein
    the first, second, and third positions are placed on a same specific axis orthogonal to axes of the optical fibers, and
    the reflector is movable on the specific axis among the first, second, and third positions.

2. The fusion splicing apparatus according to claim 1, wherein:
    the reflector has one reflection face that is turnable by 180 degrees between the first position and the second position around the specific axis.

3. The fusion splicing apparatus according to claim 2, including:
    a cam face being arranged on the reflector, faced toward an axial direction of the specific axis, and spiraled around the specific axis; and
    a guided part being guided along and moved relative to the cam face for moving the reflector in the axial direction of the specific axis and turning the reflector around the specific axis, wherein
    the cam face includes at least a pair of cam faces formed adjacent to each other in the turn direction are inclined in different directions and are faced toward each other, and adjacent parts of the pair of cam faces overlap each other in a circumferential direction.

4. The fusion splicing apparatus according to claim 3, wherein
    the reflector is configured to move to a first side in the axial direction of the specific axis, so that a first one of the pair of cam faces moves in contact with the guided part and turns by 90 degrees, and
    the reflector is configured to move to a second side in the axial direction of the specific axis, so that a second one of the pair of cam faced moves in contact with the guided part and turns by 90 degrees.

5. The fusion splicing apparatus according to claim 4, including:
    a resilient unit that moves the reflector to the first side in the axial direction of the specific axis; and
    a drive unit that moves the reflector against the resilient unit to the second side in the axial direction of the specific axis.

6. The fusion splicing apparatus according to claim 1, wherein
    the reflector has two reflection faces, the two reflection faces are arranged at positions that are spaced from each other in a direction orthogonal to the axes of the optical fibers and are separated from each other by 180 degrees around the specific axis, and the two reflection faces are movable in the direction orthogonal to the axes of the optical fibers between the first position and the second position.

7. The fusion splicing apparatus according to claim 1, wherein
    the apparatus includes a display unit that displays the images taken by the first and second imagers, the display unit individually displaying the images.

* * * * *